United States Patent [19]

Barchas et al.

[11] Patent Number: 5,082,481

[45] Date of Patent: Jan. 21, 1992

[54] MEMBRANE SEPARATION PROCESS FOR CRACKED GASES

[75] Inventors: Richard K. Barchas; Thomas P. Hickey, both of Houston, Tex.

[73] Assignee: Lummus Crest, Inc., Bloomfield, N.J.

[21] Appl. No.: 506,719

[22] Filed: Apr. 10, 1990

[51] Int. Cl.⁵ .................................................. F25J 3/06
[52] U.S. Cl. ........................................... 62/23; 55/16; 62/11
[58] Field of Search .................... 55/16, 158; 62/24, 9, 62/11, 23

[56] References Cited

U.S. PATENT DOCUMENTS 4,398,926  8/1983  Doshi ........................................ 55/16
4,548,618 10/1985  Linde et al. ............................... 55/16
4,654,047  3/1987  Hopkins et al. .......................... 62/23
4,732,583  3/1988  DeLong et al. .......................... 62/24

Primary Examiner—Ronald C. Capossela
Attorney, Agent, or Firm—Elliot M. Olstein; Raymond J. Lillie

[57] ABSTRACT

A process for recovering hydrogen from a cracking effluent wherein a cracking effluent is compressed, and then at least a portion of the hydrogen is separated from the cracking effluent prior to cooling of the cracking effluent to remove lower-boiling components. The separation of hydrogen is preferably accomplished by passing the cracking effluent through at least one semipermeable membrane.

15 Claims, 3 Drawing Sheets

MEMBRANE SEPARATION PROCESS FOR CRACKED GASES

This invention relates to the separation of components from a cracking effluent. More particularly, this invention relates to the separation of hydrogen from a cracking effluent prior to effecting a low temperature separation of other low boiling components.

Olefins such as ethylene, propylene, and other higher olefins may be produced by heating saturated hydrocarbons such as ethane, propane, or butane to elevated temperatures at which temperatures the saturated hydrocarbons are converted to olefins. For example, ethane may be dehydrogenated at elevated temperatures to produce ethylene. Similarly, naphtha, gas oil, and other heavy hydrocarbon feeds may be pyrolyzed at elevated temperatures to produce olefins.

The cracking effluent produced by the heating of a saturated hydrocarbon or naphtha or gas oil feed contains hydrogen, carbon dioxide, steam, olefins, light saturated hydrocarbons, heavy hydrocarbons, and other components. The cracking effluent is sent to a product recovery system of the olefins plant.

In the product recovery system, the cracking effluent is compressed in one or more compression stages to enable the partial liquefaction of the hydrocarbon components for separation via cryogenic distillation. Carbon dioxide, water, and heavy hydrocarbons must be removed prior to chilling of the cracking effluent to prevent these components from freezing and plugging equipment. After removal of carbon dioxide, water vapor, and heavy hydrocarbons from the cracking effluent, the effluent is passed to a low temperature separation system such as a chilling train, whereby low-boiling components such as hydrogen and methane, are separated by refrigeration of the cracked effluent.

Various means are used in an olefins plant to provide refrigeration. The higher refrigeration levels (e.g., 60° F. to −40° F.) are provided by a propylene refrigeration system. Lower refrigeration levels (−50° F. to −150° F.) are provided by an ethylene refrigeration system. There are generally three or four refrigeration levels for each of these systems. Still lower temperature levels (e.g., −160° F. to −300° F.) can be provided by one or more of the following:

1. Methane refrigeration system;
2. Joule-Thompson (isentropic) expansion of demethanizer liquid distillate product;
3. Joule Thompson expansion of low temperature condensates from the chilling train; or
4. Expansion of hydrogen vapor product from a demethanizer overhead, with concurrent power generation.

The choice of the lowest level refrigeration scheme is dependent on several factors; e.g., type of cracking feedstock, whether the hydrogen product is required at high pressure or will be used as fuel, etc.

Overall refrigeration requirements for an olefins plant can be expressed in terms of the power required for the various systems. For a plant incorporating, for example, propylene refrigeration, ethylene refrigeration, and a hydrogen expander, the refrigeration power requirements would be the propylene refrigeration system power requirement plus the ethylene refrigeration system power requirement, less the power recovered in the hydrogen expander.

It is an object of the present invention to reduce the overall refrigeration requirements for the separation of low-boiling components from the cracking effluent.

It is an object of the present invention to reduce the volume of cracking effluent that is passed to the product recovery system, thereby reducing the size of the equipment employed in the system.

In accordance with an aspect of the present invention, there is provided a process for recovering hydrogen from a cracking effluent. The process comprises compressing a cracking effluent in at least one compression stage, and separating at least a portion of the hydrogen from the compressed cracking effluent prior to refrigerating the cracking effluent to separate low-boiling components. The effluent is then subsequently cooled to effect low temperature separation of low-boiling components. In a preferred embodiment, the separation of at least a portion of the hydrogen from the cracking effluent is accomplished by passing the cracking effluent through at least one semi-permeable membrane. In one embodiment, the effluent which does not permeate the membrane is recycled to the at least one compression stage.

The at least one semi-permeable membrane may be contained in at least one membrane stage, which may be in the form of a membrane separator. A membrane separator may contain a series of alternating layers of membranes and spacers which are wrapped around a collection pipe in a "spiral-wound" fashion. Gas enters the separator, and the permeate will pass through the wrapped membranes and into the collection pipe. The permeate passes through the collection pipe and exits the separator through an outlet. Non-permeating gases, or residue, exits the separator through another outlet. The membranes may be made of polymeric materials such as cellulosic derivatives, polysulfone, polyamides, polyaramides, and polyimides. Alternatively, ceramic, glass, and metallic membranes may be employed.

In another alternative, the membrane may be made of a bundle of hollow fibers. The fibers are made of materials such as those hereinabove described. In such a separator, gas which enters the separator contacts the fiber membrane. The permeate enters the hollow fibers while the non-permeating gases, or residue remains outside the fibers. The permeate travels at reduced pressure inside the fibers to a manifold which conducts the permeate to a permeate outlet. The non-permeate, or residue, travels to a separate outlet at essentially the same pressure as the entering feed gas.

Examples of the hereinabove described membrane separators are further described in Spillman, "Economics of Gas Separation Membranes," *Chemical Engineering Progress*, January 1989 pgs. 41–62; Haggin, "New Generation of Membranes Developed for Industrial Separations," *Chemical and Engineering News*, June 6, 1988, pgs. 7–16; Monsanto, "How Prism ® Separators Work," brochure (1985); and "MEDAL-Membrane Separation System, Du Pont/Air Liquide."

Alternatively, the separation of hydrogen may take place through pressure swing adsorption. In a pressure swing adsorption system, a gas is preferentially adsorbed over others by a molecular sieve. The molecular sieve is a sponge-like solid which is precisely made so that one gas will be preferentially adsorbed over others. As an illustrative example of pressure swing adsorption, a feed gas is passed through a first tower containing a molecular sieve, which removes a specific component from the feed gas through adsorption. The nonadsorbed gas is passed to a second tower, where the process continues. Meanwhile, the pressure is dropped in the first tower in order to release the adsorbed component, thereby regenerating the molecular sieve. This cycle is continually repeated. Pressure swing adsorption is further described in a brochure published by Permea, Inc. (1987).

In another embodiment, the cracking effluent is compressed in at least two compression stages. In yet another embodiment, the effluent from at least the last of the at least two compression stages is treated to separate at least a portion of the hydrogen from the compressed cracking effluent prior to refrigerating the effluent to separate low-boiling components. Separation of at least a portion of the hydrogen from the effluent from at least the last of the at least two compression stages may be accomplished by passing the effluent through at least one semi-permeable membrane as hereinabove described.

In another embodiment, at least a portion of the carbon dioxide in the effluent is also removed before the effluent is cooled or refrigerated to separate lower-boiling components, and a portion of the hydrogen is removed from the effluent prior to the removal of the carbon dioxide.

In yet another embodiment, the effluent is subjected to a drying step (to remove water therefrom) before the effluent is cooled or refrigerated to separate lower-boiling components, and a portion of the hydrogen is removed from the effluent prior to the drying step.

The compression of the cracking effluent is carried out at pressures of from about 1 psig (compressor suction, or inlet pressure) to about 650 psig (compressor discharge pressure), preferably from about 10 psig (compressor suction) to about 550 psig (compressor discharge). When multiple stages are employed, the pressure of each compression stage is usually greater than that of the previous stage. Prior to passing of the cracked effluent to the cooling or refrigeration step to separate lower-boiling components, and also between compression stages if multiple compression stages are employed, cooling of the cracked effluent may take place through passing of the cracking effluent through one or more coolers, which may be operated at temperatures of from about 70° F. to about 150° F., preferably from about 80° F. to about 120° F.

Separation of at least a portion of the hydrogen prior to low temperature separation of lighter hydrocarbons offers numerous advantages over conventional systems. Hydrogen, because of its extremely low boiling point, approaches the behavior of a non-condensable vapor in the chilling and condensation (i.e., refrigeration) process. By removing some of the hydrogen prior to the refrigeration, condensation and separation of the other components can be carried out at higher temperatures, thereby enabling a higher average temperature level of refrigerants to be used throughout the low temperature separation, or refrigeration system. The reduction of refrigeration requirements and the use of a higher average temperature level of refrigerants results in a savings of refrigeration power requirements. To illustrate the savings of refrigeration power requirements, a cracking effluent was subjected to a refrigeration in order to remove lower-boiling components. No hydrogen was removed from the effluent prior to the refrigeration. The effluent was first subjected to propylene refrigeration at levels of 55° F., 13° F., and −40° F. Then, the effluent was subjected to ethylene refrigeration at levels of −70° F., −96° F., and −143° F. Refrigeration duty requirements for each level are given in Table 1 below.

A cracking effluent from which 20% of the hydrogen was removed prior to refrigeration was subjected to propylene and ethylene refrigeration at the levels hereinabove described. Refrigeration duty requirements for each level, as well as total refrigeration duty requirements, are given in Table I below.

TABLE I

|  | Refrigeration Temperature (°F.) | Base Case (No $H_2$ Removal) | 20% $H_2$ Removed |
|---|---|---|---|
| Propylene refrigeration | 55 | 13.32 | 12.52 |
|  | −13 | 32.97 | 35.15 |
|  | −40 | 14.49 | 13.96 |
| Ethylene refrigeration | −70 | 15.21 | 12.51 |
|  | −96 | 10.55 | 9.28 |
|  | −143 | 13.46 | 12.54 |
|  | Total | 100.00 | 96.02 |

The above table shows that, when 20% of the hydrogen is removed from the effluent prior to the refrigeration in order to remove lower-boiling components, the overall refrigeration duty requirements are reduced by 3.98%. In addition, when 20% of the hydrogen is removed from the effluent, the distribution of the duty requirements becomes increasingly skewed toward the higher temperature refrigerants. Thus, the refrigeration is carried out at a higher average temperature, saving considerably more than 4% in power requirements.

In addition, the removal of hydrogen before the refrigeration of the cracking effluent reduces the volume of cracked gases to be refrigerated. This reduction in volume enables one to cool the effluent to separate low boiling components in smaller equipment.

When a semi-permeable membrane(s) is employed to separate at least a portion of the hydrogen from the cracking effluent, the semi-permeable membrane(s) may also be used to separate at least a portion of the carbon dioxide and at least a portion of the steam or water vapor from the cracking effluent as well. Thus, the cracking effluent may be passed through the membrane(s) prior to passing the effluent through conventional carbon dioxide removal and drying systems of the product recovery operation. Thus, the load on the carbon dioxide removal and the drying systems may be reduced in addition to the reduction of the load on the low temperature separation, or refrigeration system.

The invention will now be described with respect to the drawings, wherein.

Figure 1:
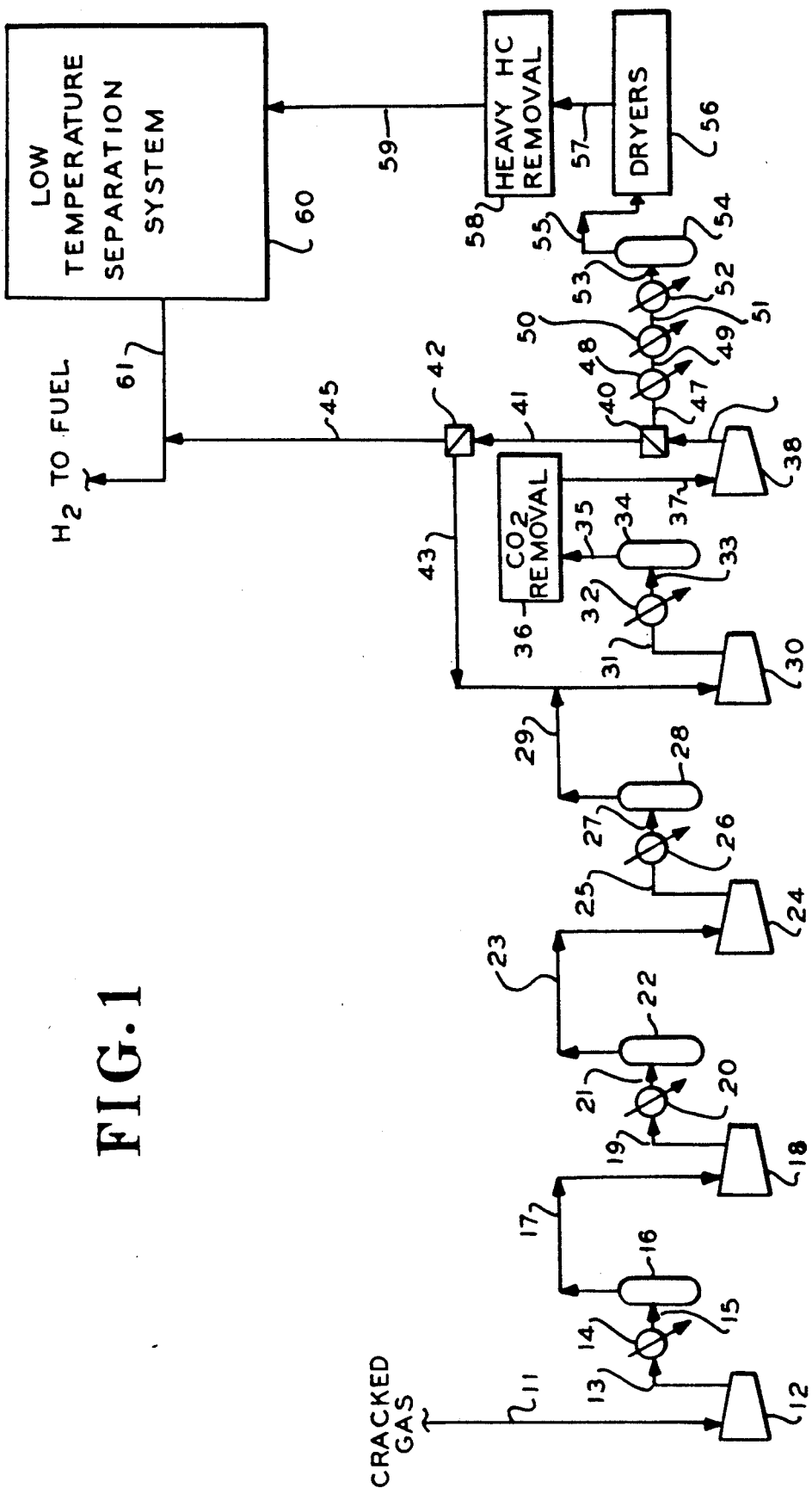
FIG. 1 is a schematic of a first embodiment of the separation process of the present invention.

Referring now to the drawings, a cracked gas effluent, produced as a result of heating and cracking of saturated hydrocarbons, preferably a heavier saturated hydrocarbon cracking feed, such as naphtha or gas oil, in line 11 is fed to a first stage compressor 12, which is operated at an outlet pressure of from about 20 psig to about 50 psig, preferably from about 25 psig to about 40 psig. The cracked effluent is then withdrawn from first compressor 12 through line 13, and passed through interstage cooler 14, which cools the effluent to a temperature of from about 80° F. to about 120° F. The effluent is then withdrawn from cooler 14 through line 15, passed to knockout drum 16, line 17, and to second stage compressor 18, which is operated at an outlet pressure of from about 60 psig to about 100 psig. The cracking effluent then is withdrawn through line 19, and passed to interstage cooler 20, which cools the effluent to a temperature of from about 80° F. to about 120° F. The effluent is withdrawn through line 21, passed to knockout drum 22, withdrawn from knockout drum 22 through line 23, and then passed to third stage compressor 24. Third stage compressor 24 is operated at an outlet pressure of from about 100 psig to about 250 psig, preferably from about 120 psig to about 200 psig. The effluent then is withdrawn from compressor 24 through line 25, and is passed through interstage cooler 26, which cools the effluent to a temperature of from about 80° F. to about 120° F. the effluent is then withdrawn through line 27, and passed through knockout drum 28 and line 29 fourth stage compressor 30. As the effluent is being passed through line 29, it becomes admixed with recycle effluent from line 43.

Fourth stage compressor 30 is operated at an outlet pressure of from about 200 psig to about 400 psig, preferably from about 250 psig to about 350 psig. The effluent then is withdrawn through line 31, passed to interstage cooler 32, which cools the effluent to a temperature of from about 80° F. to about 120° F. The effluent then is passed to line 33, and to knockout drum 34. The effluent is withdrawn from knockout drum 34 through line 35 and passed to carbon dioxide removal system 36, whereby carbon dioxide is separated from the effluent by conventional means well known in the art.

After the carbon dioxide is separated from the effluent, the effluent is withdrawn from separation system 36 through line 37 and passed to fifth stage compressor 38, which is operated at an outlet pressure of from about 450 psig to about 650 psig, preferably from about 500 psig to about 600 psig. The effluent then is withdrawn through line 39 and passed to first membrane stage 40. First membrane stage 40 contains a semi-permeable membrane which is constructed as hereinabove described. First membrane stage 40 is operated at a permeate outlet pressure of from about 100 psig to about 300 psig. Hydrogen, along with some ethylene and other hydrocarbons, permeates through the membrane, whereby at least a portion of the hydrogen is separated from the cracking effluent, and is sent through line 41 to second membrane stage 42. Some water vapor may also permeate the membrane in first membrane stage 40 as well. Second membrane stage 42 is operated at a permeate outlet pressure of from about 1 psig to about 100 psig, preferably from about 10 psig to about 50 psig. Hydrogen permeates through the membrane in second membrane stage 42 and is withdrawn through line 45, and passed to line 61, whereby the recovered hydrogen is sent to fuel. Residual, or non-permeating, gases are withdrawn from second membrane stage 42 through line 43, and passed to line 29, whereby the residual gases are admixed with "fresh" cracking effluent and recycled to fourth stage compressor 30.

Residual gases which do not permeate through the membrane in first membrane stage 40 are withdrawn from first membrane stage 40 through line 47. The effluent in line 47 is passed through cooler 48, line 49, cooler 50, line 51, cooler 52, line 53, knockout drum 54, line 55, and enters drying system 56, which may include one or more dryers. Drying system 56 is operated under conditions well known to those skilled in the art, and serves to remove water vapor from the cracked effluent. The effluent then is withdrawn through line 57 and passed to heavy hydrocarbon removal zone 58. Heavy hydrocarbon removal zone 58 is a conventional heavy hydrocarbon removal system and is operated under conditions well known to those skilled in the art.

The effluent, from which heavy hydrocarbons have been separated, is withdrawn from heavy hydrocarbon removal zone 58 through line 59 and passed to low temperature separation system 60. Low temperature separation system serves to separate low boiling components such as hydrogen, methane, and ethane from the cracking effluent. The low temperature separation system 60 may include, for example, a chilling or refrigerating train, a hydrogen expander to recover power, and a demethanizer. The effluent may also be passed through low temperature separation system 60 in such a manner that a cascade effect is produced. Refrigeration is carried out at temperatures of from about 70° F. to about $-250°$ F., preferably from about 60° F. to about $-220°$ F. Because at least a portion of the hydrogen has been separated from the cracking effluent prior to the refrigeration of the effluent in low temperature separation system 60 to remove low-boiling components, refrigeration and condensation of the various low-boiling hydrocarbons may be carried out at higher average temperature levels than those normally employed in a low-temperature separation system. The overall refrigeration requirements are reduced, and a higher average temperature level of refrigerants may be used throughout the low temperature separation system 60.

After the refrigeration of the effluent in low temperature separation system 60 to remove low-boiling components, a desired olefin product (e.g., ethylene and/or propylene) may be recovered, and hydrogen separated from the effluent is withdrawn through line 61 and sent to fuel.

Figure 2:
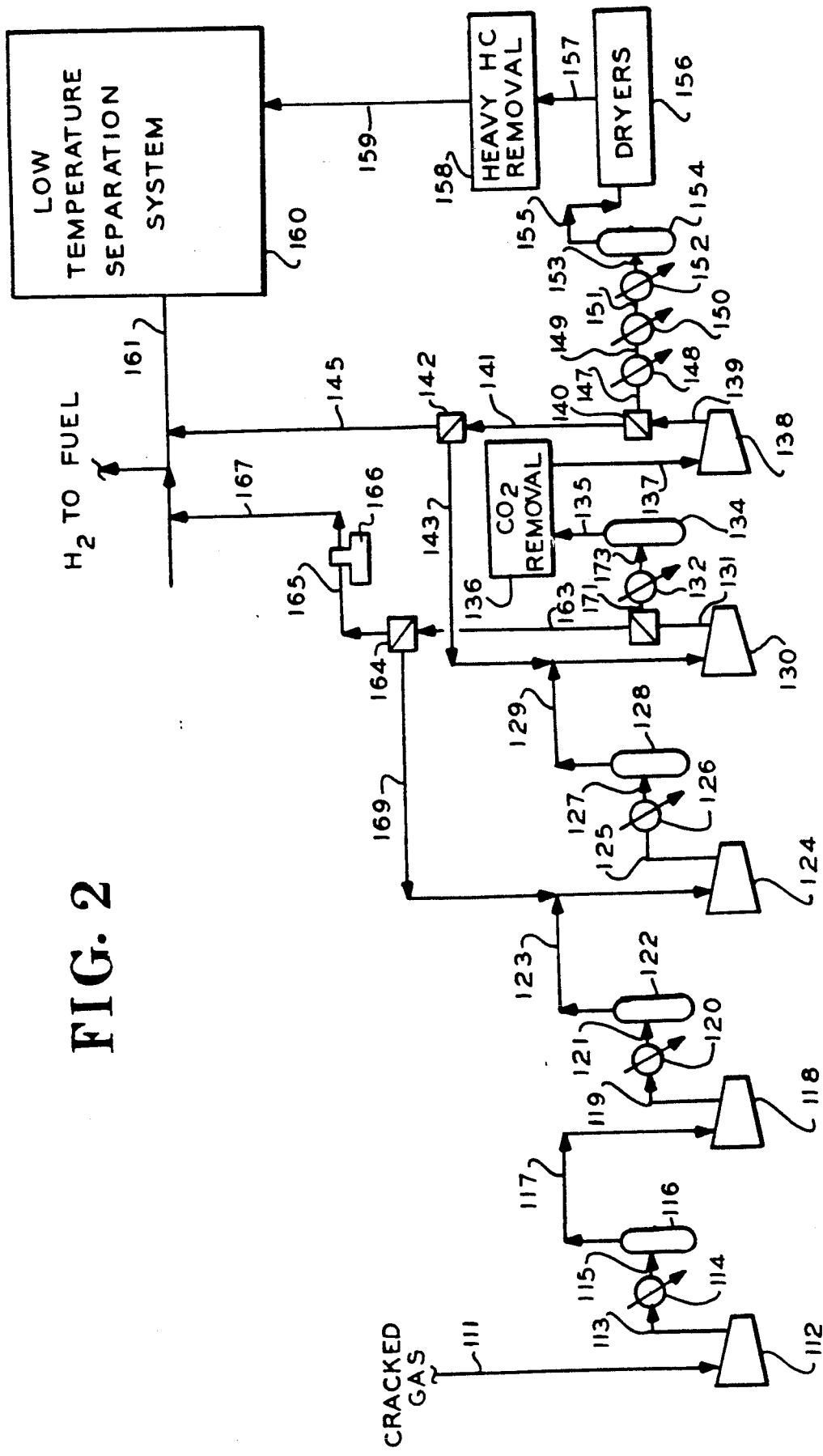
FIG. 2 is a schematic of an alternative embodiment of the separation process of the present invention.

In accordance with another embodiment, as shown in FIG. 2, a cracking effluent, as hereinabove described, in line 111 is passed to first stage compressor 112, withdrawn from first stage compressor 112 through line 113, passed through interstage cooler 114, line 115, knockout drum 116, line 117, and then passed to second stage compressor 118. The effluent is then withdrawn from second stage compressor 118 through line 119, passed through interstage cooler 120, line 121, knockout drum 122, line 123, and then passed to third stage compressor 124. Recycle residual gases from line 169 also enter line 123 and are admixed with the cracking effluent fed to third stage compressor 124. The cracking effluent is then withdrawn through line 125, and passed through interstage cooler 126, line 127, knockout drum 128, line 129, and passed to fourth stage compressor 130. Residual gases from line 143 are also admixed with the effluent in line 129 to be recycled to fourth stage compressor 130 as well.

The effluent is then withdrawn from fourth compression stage 130 through line 131 and passed to membrane stage 16i. Hydrogen, as well as carbon dioxide and water vapor, along with ethylene and other hydrocarbons, permeates through the membrane, passes through line 163, and enters membrane stage 164. Hydrogen permeates the membrane of stage 164, passes through line 165, compressor 166, line 167, and passes to line 161, whereby the separated hydrogen is sent to fuel. Some carbon dioxide may permeate the membrane of stage 164 as well, and is also sent to fuel. Residual gases (i.e., non-permeating gases) are withdrawn from stage 164 through line 169, and passed to line 123, whereby the residual gases are recycled to third stage compressor 124.

The non-permeating effluent in membrane stage 162 is withdrawn through line 171, passed through interstage cooler 132, line 173, knockout drum 134, line 135, and passed to carbon dioxide separation system 136. Because a portion of the carbon dioxide has already been separated from the cracking effluent, the load on the carbon dioxide separation system 136 has been reduced. Upon separation of carbon dioxide from the effluent, the effluent is withdrawn from the carbon dioxide separation system 136 through line 137 and passed to fifth stage compressor 138.

The effluent is then withdrawn from fifth stage compressor 138 through line 139 and passed to membrane stage 140. Hydrogen and water vapor, as well as some ethylene and other hydrocarbons, permeate the membrane in stage 140, pass through line 141, and are passed to membrane stage 142. Hydrogen permeates through the membrane of stage 142, passes through line 145, and is passed to line 161, whereby the hydrogen is sent to fuel. Residual, or non-permeating, gases are withdrawn through line 143 and passed to line 129, whereby the residual gases are recycled to fourth stage compressor 130.

Effluent which does not permeate the membrane of membrane stage 140 is withdrawn through line 147, passed through cooler 148, line 149, cooler 150, line 151, cooler 152, line 153, knockout drum 154, line 155, and enters drying zone 156, whereby any remaining water vapor or steam is removed from the cracking effluent. The effluent is then withdrawn from drying zone 156 through line 157 and passed to heavy hydrocarbon separation zone 158, whereby heavy hydrocarbons are separated from the effluent.

The effluent, upon removal of the heavy hydrocarbons therefrom, is withdrawn from heavy hydrocarbon separation zone 158 through line 159, and passed to low temperature separation system 160. Low temperature separation system 160, operated as hereinabove described, serves to separate low boiling components from the cracking effluent, and a desired olefin product is subsequently recovered. Hydrogen separated from the effluent in low temperature separation system 160 is withdrawn through line 161 and sent to fuel.

Figure 3:
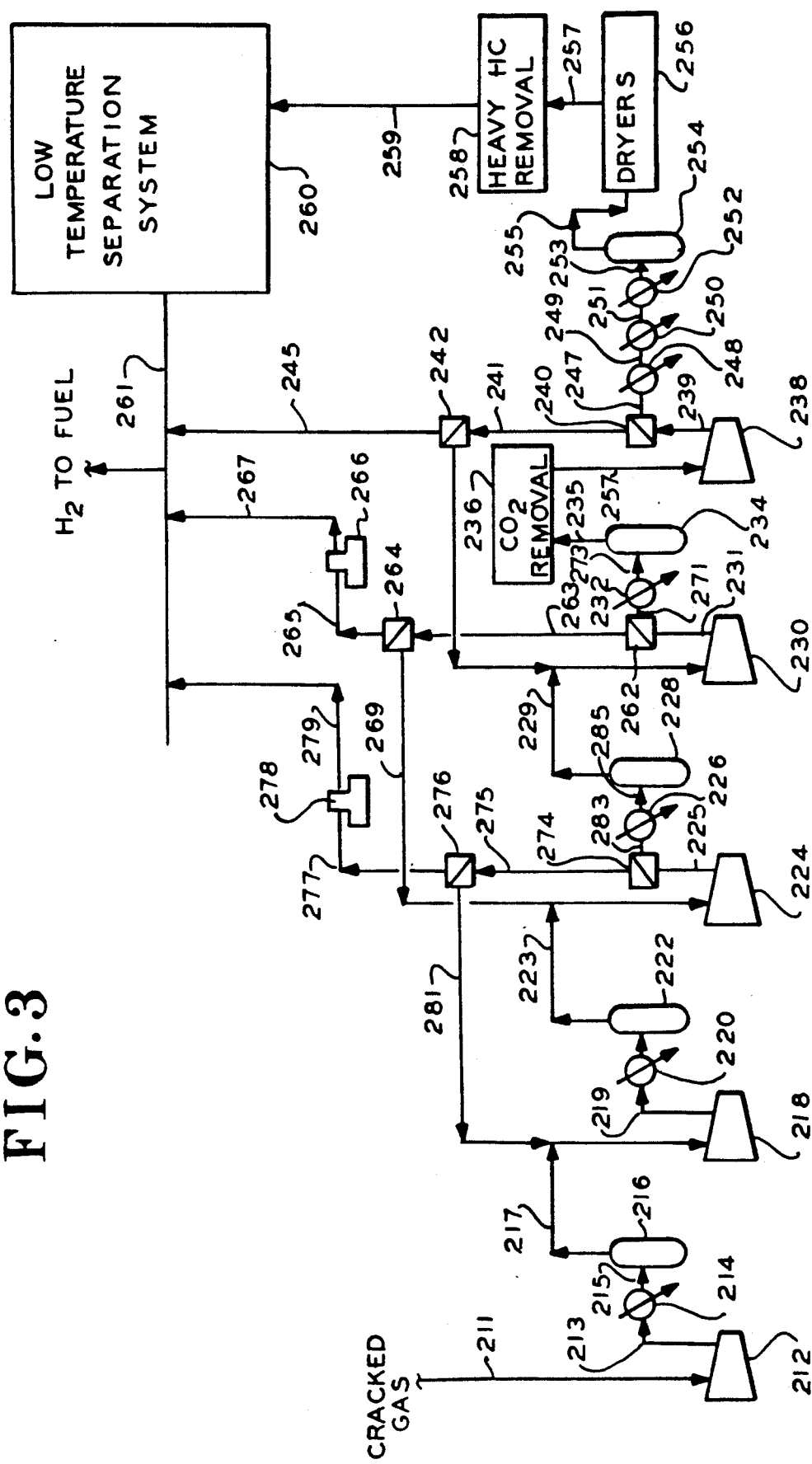
FIG. 3 is a schematic of another alternative embodiment of the separation process of the present invention.

In accordance with another embodiment, shown in FIG. 3, a cracking effluent in line 211 is passed to first stage compressor 212, and then withdrawn from first stage compressor 212 through line 213. The effluent is then passed through interstage cooler 214, line 215, knockout drum 216, line 217, and then passed to second stage compressor 218. Residual gasses from line 281 are also passed to line 217, whereby the effluent and the residual gases are admixed in line 217 and passed to second stage compressor 218. The effluent is withdrawn from second stage compressor 218 through line 219, passed through interstage cooler 220, line 221, knockout drum 222, line 223, and passed to third stage compressor 224. Residual recycle gases from line 269 are also passed to line 223 for introduction into third stage compressor 224.

Effluent is then withdrawn from third stage compressor 224 through line 225, and passed to membrane stage 274. Hydrogen, carbon dioxide, water vapor, as well as some ethylene and other hydrocarbons permeate the membrane in stage 274 and pass through line 275 to membrane stage 276. Hydrogen which permeates through the membrane in stage 276 is withdrawn through line 227, passed through compressor 278 and line 279, and is passed to line 261 whereby the hydrogen is sent to fuel. Residual, or non-permeating, gases are withdrawn through line 281, passed to line 217, and recycled to second stage compressor 218.

Effluent which does not permeate the membrane in stage 274 is withdrawn through line 283, passed through interstage cooler 226, line 285, knockout drum 228, line 229, and passed to fourth stage compressor 230. Also entering line 229 are residual gases from line 243 which are recycled to fourth stage compressor 230. The effluent is then withdrawn from fourth stage compressor 230 through line 231 and passed to membrane stage 262. Hydrogen, carbon dioxide, water vapor, ethylene and other hydrocarbons permeate the membrane in stage 262, pass through line 263, and enter membrane stage 264. Hydrogen which permeates the membrane of stage 264 is withdrawn from stage 264 through line 265, and passes through compressor 266, line 267, and is sent to line 279. The hydrogen then enters line 261 whereby the hydrogen is sent to fuel. Residual nonpermeating gases are withdrawn from stage 264 through line 269, whereby the residual gases are recycled to line 229 and fourth stage compressor 230.

Effluent which does not permeate membrane stage 262 is withdrawn through line 271, and passed through interstage cooler 232, line 273, knockout drum 234, line 235, and enters carbon dioxide separation system 236. After the remaining carbon dioxide (i.e., carbon dioxide not seperated by membrane stages 262, 264, 274, or 276) is separated from the cracking effluent, the effluent is withdrawn from carbon dioxide separation system 236 through line 237 and passed to fifth stage compressor 238. The cracking effluent is then withdrawn from fifth stage compressor 238 through line 239 and is passed to membrane stage 240. Hydrogen, water vapor, and some ethylene and other hydrocarbons permeate the membrane in stage 240, and pass through line 241 to membrane stage 242. Hydrogen which permeates the membrane in stage 242 passes through line 245 and enters line 261, whereby the hydrogen is sent to fuel. Non-permeating residual gases are withdrawn from stage 242 through line 243, and recycled to line 229 and fourth stage compressor 230.

Effluent which does not permeate the membrane in stage 240 is withdrawn through line 247, and passed through cooler 248, line 249, cooler 250, line 251, cooler 252, line 253, knockout drum 254, line 255, and enters drying system 256, whereby water vapor is separated, or driven off from the effluent. After drying, the effluent is withdrawn from drying system 256 through line 257, and passed to heavy hydrocarbon separation system 258, whereby heavy hydrocarbons are separated from the effluent. The effluent is then withdrawn from heavy hydrocarbon removal system 258 through line 259 and passed to low temperature separation system 260. In low temperature separation system 260, low-boiling components, such as any remaining hydrogen, methane, and ethane are separated from the effluent inm order to enable the recovery of a desired olefine product. Hydrogen which is separated from the effluent in low temperature removal system 260 is withdrawn through line 261 and is sent to fuel.

Althrough the drawings depict five compression stages, and membrane stages located after either the fifth, the fourth and fifth, or the third, fourth, and fifth compression stages, the scope of the present invention is not intended to be limited to a specific number of compression stages or to specific locations of the membrane stages, or to specific numbers of membrane stages located after each compression stage.

For example, in one alternative, the effluent may pass through just one membrane stage instead of two membrane stages as shown in the drawings. In such an alternative, the hydrogen which permeates the membrane may be sent to fuel, and the non-permeate is sent to the next compression stage or to the drying, heavy hydrocarbon removal, and low temperature separation zones. In another alternative, the permeate from the first membrane stage may be passed to a booster compressor (not shown) before passing the first stage permeate to the second membrane stage. Also contemplated is an alternative wherein the residue from the membrane stage(s) is recycled to a compressor which is two or more stages upstream, as opposed to passing the residue to the compressor of the immediately preceding compression stage.

The invention will now be described with respect to the following examples; however, the scope of the present invention is not intended to be limited thereby.

EXAMPLE

A compressed cracked gas effluent was fed to a first membrane stage for separation of a portion of the hydrogen from the cracking effluent. The feed to the membrane stage had the following simplified materials balance (Line 39 of FIG. 1):

| Component | Lb. Mole/Hr. | Mole % |
|---|---|---|
| Hydrogen | 4375.08 | 28.460 |
| Methane | 2295.15 | 14.930 |
| Acetylene | 4.61 | 0.030 |
| Ethane | 2422.74 | 15.760 |
| Ethylene | 5183.68 | 33.720 |
| Propane | 213.68 | 1.390 |
| Unsaturated C$_3$'s | 567.25 | 3.690 |
| C$_4$ and heavier | 310.53 | 2.020 |
| Totals | 15372.7 | 100.0 |
| Average mol. wt. | | 20.5 |
| Total MSCFD | | 139,999 |
| Total lbs./hr. | | 315,333 |
| Pressure, psia | | 515.0 |

The residual or non-permeating gases had a simplified material balance as follows (Line 47 of FIG. 1):

| Component | Lb. Mole/Hr. | Mole % |
|---|---|---|
| Hydrogen | 3220.45 | 22.902 |
| Methane | 2253.03 | 16.022 |
| Acetylene | 4.53 | 0.032 |
| Ethane | 2388.83 | 16.988 |
| Ethylene | 5116.54 | 36.385 |
| Propane | 211.19 | 1.502 |
| Unsaturated C$_3$'s | 560.63 | 3.987 |
| C$_4$ and heavier | 306.90 | 2.182 |
| Totals | 14062.1 | 100.0 |
| Average mol. wt. | | 22.0 |
| Total MSCFD | | 128,064 |
| Total lbs./hr. | | 308,825 |
| Pressure, psia | | 490.0 |

The permeate from the first membrane stage had a simplified material balance as follows (Line 41 of FIG. 1):

| Component | Lb. Mole/Hr | Mole % |
|---|---|---|
| Hydrogen | 1154.63 | 88.098 |
| Methane | 42.11 | 3.213 |
| Acetylene | 0.08 | 0.006 |
| Ethane | 33.91 | 2.588 |
| Ethylene | 67.14 | 5.123 |
| Propane | 2.49 | 0.190 |
| Unsaturated C$_3$'s | 6.62 | 0.505 |
| C$_4$ and heavier | 3.62 | 0.277 |
| Totals | 1310.6 | 100.0 |
| Average mol. wt. | | 5.0 |
| Total MSCFD | | 11,936 |
| Total lbs./hr. | | 6,507 |
| Pressure, psia | | 130.0 |

The permeate having the simplified material balance hereinabove described, from the first membrane stage was then passed to a second membrane stage. The residue, or non-permeating gases from the second membrane stages, had a simplified material balance as follows (Line 43 of FIG. 1):

| Component | Lb. Mole/Hr. | Mole % |
|---|---|---|
| Hydrogen | 265.03 | 63.673 |
| Methane | 40.47 | 9.723 |
| Acetylene | 0.08 | 0.018 |
| Ethane | 32.92 | 7.909 |
| Ethylene | 65.31 | 15.691 |
| Propane | 2.43 | 0.584 |
| Unsaturated C$_3$'s | 6.46 | 1.551 |
| C$_4$ and heavier | 3.54 | 0.851 |
| Totals | 416.2 | 100.0 |
| Average mol. wt. | | 11.0 |
| Total MSCFD | | 3,791 |
| Total lbs./hr. | | 4,592 |
| Pressure, psia | | 105.0 |

This residue is recycled to the compression system.

The permeate from the second membrane stage had a simplified material balance as follows (Line 45 of FIG. 1):

| Component | Lb. Mole/Hr. | Mole % |
|---|---|---|
| Hydrogen | 889.61 | 99.465 |
| Methane | 1.64 | 0.183 |
| Acetylene | 0.00 | 0.000 |
| Ethane | 1.00 | 0.112 |
| Ethylene | 1.83 | 0.205 |
| Propane | 0.06 | 0.007 |
| Unsaturated C$_3$'s | 0.16 | 0.018 |
| C$_4$ and heavier | 0.09 | 0.010 |
| Totals | 894.4 | 100.0 |
| Average mol. wt. | | 2.1 |
| Total MSCFD | | 8,145 |
| Total lbs./hr. | | 1,916 |
| Pressure, psia | | 65.0 |

From the above example, it is shown that by passing the cracking effluent through the two membrane stages, approximately 20.3% of the hydrogen is separated from the cracking effluent before the effluent is cooled to remove low-boiling components.

Advantages of the present invention include the reduction of the overall refrigeration requirements as a result of the removal of at least a portion of the hydrogen from the cracking effluent prior to refrigeration of the cracking effluent to remove low-boiling components. The removal of at least some of the hydrogen prior to chilling or refrigeration enables condensation of the various low-boiling hydrocarbons to take place at higher temperatures, which enables the use of lower quantities of higher temperature level refrigerants to be used throughout the chilling train. The use of a higher average refrigeration temperature and reduced refrigeration duty requirements results in a savings in overall refrigeration power requirements.

In addition, when the membrane stage(s) is employed prior to passing the effluent to a conventional carbon dioxide separation system and/or a drying system, some carbon dioxide and water vapor will permeate the membrane along with the hydrogen. This separation of carbon dioxide and water vapor reduces the load on the carbon dioxide separation and drying systems.

Also, by removing at least a portion of the hydrogen, carbon dioxide, and/or water vapor from the effluent, the volume of cracked gases which are processed in the product recovery system is reduced, which enables one to use smaller product recovery equipment.

When means for separating hydrogen from the cracking effluent are located after more than one compression stage, one may also use smaller compression equipment.

It is to be understood that the scope of the specific embodiments described above. Numerous modifications of the above teachings may be made, and within the scope of the accompanying claims, the invention may be practiced other than as particularly described.

What is claimed is:

1. A process for recovering hydrogen, carbon dioxide, and water from a cracking effluent containing at least one olefin, comprising:
   compressing said cracking effluent in at least one compression stage;
   separating at least a portion of the hydrogen, carbon dioxide, and water from the compressed cracking effluent prior to refrigerating said cracking effluent to separate low-boiling components; and
   subsequently cooling the effluent to effect low temperature separation of low-boiling components.

2. The process of claim 1 wherein said separating of at least a portion of the hydrogen, carbon dioxide, and water from the compressed cracking effluent is accomplished by passing said cracking effluent through at least one semi-permeable membrane.

3. The process of claim 2 wherein at least a portion of the non-permeating effluent is recycled to said at least one compression stage.

4. The process of claim 1 wherein said at least one olefin includes ethylene.

5. The process of claim 1 wherein said cracking effluent is compressed in at least two compression stages.

6. The process of claim 5 wherein the effluent from at least the last of said at least two compression stages is treated to separate at least a portion of the hydrogen from the compressed cracking effluent prior to refrigerating said effluent to separate low-boiling components.

7. The process of claim 1 wherein said effluent is compressed at a pressure of from about 1 psig to about 650 psig.

8. The process of claim 7 wherein said effluent is compressed at a pressure of from about 10 psig to about 550 psig.

9. A process for recovering hydrogen, carbon dioxide, and water from a cracking effluent containing at least one olefin, comprising:
   compressing said cracking effluent in at least one compression stage;
   passing said compressed cracking effluent through at least one semi-permeable membane to separate at least a portion of the hydrogen, carbon dioxide, and water therefrom prior to refrigerating said cracking effluent to separate low-boiling components; and
   subsequently cooling the effluent to effect low temperature separation of low boiling components.

10. The process of claim 9 wherein at least a portion of the non-permeating effluent is recycled to said at least one compression stage.

11. The process of claim 9 wherein said cracking effluent is compressed in at least two compression stages.

12. The process of claim 11 wherein the effluent from at least the last of said at least two compression stages is treated to separate at least a portion of the hydrogen from the compressed cracking effluent prior to refrigerating said effluent to separate low boiling components.

13. The process of claim 9 wherein said effluent is compressed at a pressure of from about 1 psig to about 650 psig.

14. The process of claim 13 wherein said effluent is compressed at a pressure of from about 10 psig to about 550 psig.

15. The process of claim 9 wherein said at least one olefin includes ethylene.

* * * * *